United States Patent
Kishi et al.

(10) Patent No.: US 8,335,177 B2
(45) Date of Patent: Dec. 18, 2012

(54) COMMUNICATION SYSTEM

(75) Inventors: Masaru Kishi, Tokyo (JP); Makoto Kinoshita, Tokyo (JP)

(73) Assignee: Azbil Corporation, Tokyo (JP)

( * ) Notice: Subject to any disclaimer, the term of this patent is extended or adjusted under 35 U.S.C. 154(b) by 322 days.

(21) Appl. No.: 12/783,041

(22) Filed: May 19, 2010

(65) Prior Publication Data

US 2010/0296515 A1   Nov. 25, 2010

(30) Foreign Application Priority Data

May 20, 2009   (JP) ................................. 2009-122062

(51) Int. Cl.
    *H04H 20/71*   (2008.01)
(52) U.S. Cl. .......................... 370/312; 370/349; 370/400
(58) Field of Classification Search .................. 370/256, 370/353, 390, 395.2, 395.53, 312, 349, 400
    See application file for complete search history.

(56) References Cited

U.S. PATENT DOCUMENTS

| | | | |
|---|---|---|---|
| 6,741,590 B1* | 5/2004 | Duke et al. ..................... | 370/389 |
| 6,751,191 B1* | 6/2004 | Kanekar et al. ............... | 370/217 |
| 7,327,683 B2* | 2/2008 | Ogier et al. ................... | 370/236 |
| 7,633,883 B2* | 12/2009 | Cho et al. ...................... | 370/252 |
| 7,804,769 B1* | 9/2010 | Tuplur et al. ................... | 370/218 |
| 7,855,950 B2* | 12/2010 | Zwiebel et al. ............... | 370/216 |
| 8,204,034 B2* | 6/2012 | Ahuja et al. .................. | 370/349 |
| 2009/0041035 A1* | 2/2009 | Matsuo et al. ................ | 370/400 |
| 2009/0190598 A1* | 7/2009 | Christensen et al. .... | 370/395.53 |
| 2009/0245254 A1* | 10/2009 | Ohno ............................ | 370/390 |

FOREIGN PATENT DOCUMENTS

JP   2009-32120 A   2/2009

* cited by examiner

*Primary Examiner* — Robert Wilson
*Assistant Examiner* — Brian O Connor
(74) *Attorney, Agent, or Firm* — Troutman Sanders LLP

(57) ABSTRACT

A virtual node ID control unit controls a virtual node ID that specifies a plurality of nodes as a single group. A status control unit controls node statuses that include information indicating the operating statuses of each individual node belonging to the group, and selects an operating mode that is either a priority mode. The local mode operates as an active node, or a standby mode, and the local mode operates as a standby node. A transmission/reception control unit controls the operation of the local node in accordance with the operating mode selected by the status control unit.

1 Claim, 9 Drawing Sheets

Fig. 2

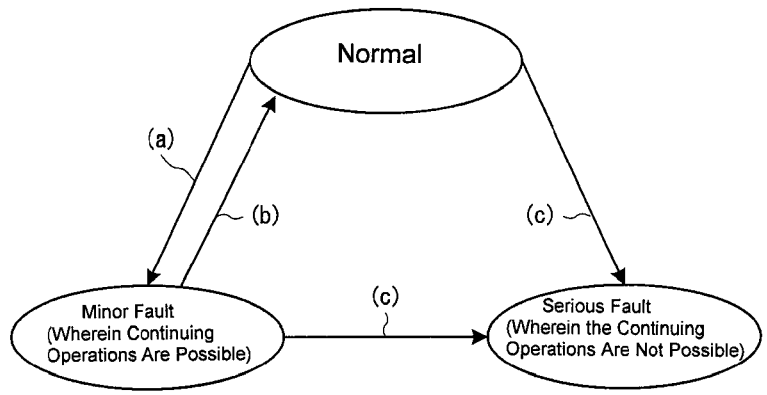

Fig. 3

| Local Node Flag | O | ... |
|---|---|---|
| Node Information<br>< Unicast Address > | Server Device a<br><XX. XX. ⋯. ⋯> | Server Device b<br><XX. XX. ⋯. ⋯> |
| Status Information | Normal | Normal |
| Operating Mode Information<br>< Active/Standby > | Priority Mode<br><Active> | Standby Mode<br>< Standby > |

Fig. 4

| Active System \ Standby System | Standby Server Node Status | | | |
|---|---|---|---|---|
| | Normal | Minor Fault | Serious Fault | Undefined |
| Active Server Node Status: Normal | Maintain | Maintain | Maintain | Maintain |
| Minor Fault | Switch | Maintain | Maintain | Maintain |
| Serious Fault | Switch | Switch | Maintain | Maintain |
| Undefined | Switch/Maintain *1 | None/Maintain *1 | None/Maintain *1 | None |

*1 : "Maintain" in the case wherein the standby system has switched from the active system.

Fig. 8

| Type of Message | Detail |
|---|---|
| Read Request | Read requiring a response: Request |
| Write Request | Write requiring a response: Request |
| Read/Write Response | Message in response to a write/read request: Response |
| Status Send needless Ack | Status notification message <Reception Confirmation Notification Not Needed>: Request |
| Status Send need Ack | Status notification message <Reception Confirmation Notification Needed>: Request |
| Status Ack | Message in Response to Status Notification Requests: Response |

Fig. 9

| Type of Message | Reception Process | Transmission Process |
|---|---|---|
| Read Request | Notification to an application within the device | Transmission to a transmission destination address |
| Write Request | Notification to an application within the device | No transmission to the outside (*2) |
| Read/Write Response | Notification to an application within the device (*2) | No transmission < standby > |
| Status Send needless Ack | Notification to an application within the device | No transmission < standby > |
| Status Send need Ack | Notification to an application within the device | No transmission < standby > |
| Status Ack | Notification to an application within the device | No transmission < standby > |

※2 : Notification of a dummy response within the device

Fig. 12

| Virtual Node ID <Multicast Address> | Corresponding Nodes <Unicast Addresses> | | | | |
|---|---|---|---|---|---|
| | Server Node (a) <OOO×> | Server Node (b) <OOO△> | Server Node (n) <OOOO> | Client Node (a) <OO××> | Client Node (m) <OO△△> |
| ID: A <□□□□> | × : Does not Apply | × : Does not apply | × : Does not apply | O : Applies | O : Applies |
| ID: B <△△△△> | O : Applies | O : Applies | O : Applies | × : Does not Apply | × : Does not apply |
| ID: C <××××> | × : Does not Apply | O : Applies | O : Applies | × : Does not apply | × : Does not apply |
| ……… | ……… | ……… | ……… | ……… | ……… |

COMMUNICATION SYSTEM

CROSS REFERENCE TO RELATED APPLICATIONS

The present application claims priority under 35 U.S.C. §119 to Japanese Patent Application No. 2009-122062, filed May 20, 2009, which is incorporated herein by reference.

FIELD OF TECHNOLOGY

The present invention relates to a communication system, and in particular, relates to a communication system wherein a plurality of nodes perform data communication through a network.

BACKGROUND OF THE INVENTION

Sometimes, in a communication system that is structured from a plurality of communication devices such as computers and routers (hereinafter termed "nodes") that are connected to a network, there is the need for operations to run properly continuously, depending on the application and purpose. For example, in communication systems that perform control and management of manufacturing lines to achieve improved manufacturing efficiency in product manufacturing, or communication systems for monitoring operations and controlling maintenance of equipment that operates continuously on a large scale, such as in plant equipment, or the like, there is the need for communication systems that operate continuously with stability.

Conventionally, in these types of communication systems, construction of redundant structures through the provision of a plurality of nodes having identical functions, so that if one node were to fall into a non-operating state, the other nodes, having identical functions, would continue to operate, has been used as means for achieving stable and continuous system operations.

Japanese Unexamined Patent Application Publication 2009-32120 ("JP '120") discloses, as a technology for achieving a redundant structure in a communication system such as set forth above, a technology wherein a plurality of server devices, having identical functions, is provided in a communication system wherein server devices and client devices perform data communication through a network, wherein, if one server device were to become inoperable, the communication destination of the client device that has requested processing from a server device switches to another server device having identical functions.

However, the technology disclosed in JP '120 is one wherein a function for monitoring the state of operations of a server device is provided in a client device, or wherein a function for controlling the state of operation of the communication network as a whole is provided in the communication network in order to switch the server device with which the client device communicates. Consequently, in order to achieve stable and continuous operations of the communication system through a redundant structure for the server devices, both the server devices and the client devices will have structures that are complex and specialized, both in terms of hardware and in terms of software, and thus there is a problem in that the production thereof is extremely costly and time-consuming.

Furthermore, in recent years there have been increasing demands for stable and continuous operations in not just the large-kale, high-cost communication systems, but in small-scale and inexpensive communication systems as well.

The present invention is to solve the problems set forth above, and the object thereof is to provide a communication system that achieves stable and continuous operations, wherein the redundant structure can be constructed easily.

SUMMARY OF THE INVENTION

In order to achieve the object set forth above, the communication system according to the present invention has a plurality of nodes that structure a network and that perform transmission and reception of data, wherein each of a plurality of nodes that is a portion of these nodes has: a virtual node ID control unit for controlling virtual node IDs that specify the plurality of nodes of that portion as a single group; a status control unit for controlling node statuses, which includes information indicating the operating status of each individual node included in the group, and that also selects either a priority mode for causing the local node to operate as an active node or a standby mode to cause the local node to operate as a standby node; and a transmission/reception control unit for controlling the local node depending on the operating mode selected by the status control unit.

Additionally, the status control unit in the present invention may have: a node status control table for controlling the node statuses of each of the nodes belonging to the group; an operating mode determining table wherein are defined relationships between the node statuses for each node and the local node operating mode determining criteria; and an operating mode determining unit for determining the operating mode of the local node based on the operating mode determining table.

Furthermore, the status control unit may further have an updating unit for updating periodically the node status of the local node and the node statuses of the other nodes belonging to the group.

Furthermore, the transmission/reception control unit of the node may transmit message data to a plurality of nodes belonging to the group corresponding to the virtual node ID.

Furthermore, the plurality of nodes belonging to the group may perform processing operations in response to message data received from another node when in priority mode.

Additionally, each of the plurality of nodes may be structured comprising a communication mode control unit for selecting, based on the content of the data that is transmitted or received by the local node, a communication mode for either data communication according to a virtual node ID, or data communication according to a unique unicast address.

Furthermore, the virtual node ID control unit may have a virtual node ID table for storing the unique unicast address of the node in association with a virtual node ID.

Given the present invention, all of the nodes having virtual node IDs receive message data through message data being sent to virtual node IDs, and thus a node that transmits message data need not specify individually the nodes that are the transmission destinations for the message data.

Furthermore, a node that receives the message data, from among the nodes that structure the communication system, not only controls the node status of the local mode, but is also linked to another node having the same function, to share all of the node statuses that are controlled by each of the nodes, and thus it is possible to determine, based on the shared node statuses, whether the operating mode of the local node is to be active or standby. Consequently, the provision of a process for constructing the redundant structure of the plurality of nodes having identical functions, or in other words, the provision of a process for determining the operating modes of the plurality of nodes can be done easily.

The result is that the node that requests a process, or in other words, the node that sends a message, need not evaluate whether or not a specific node that is the transmission destination of the message data is a redundant structure, but rather it is possible to achieve the transmission of the message to a node that has a redundant structure through merely sending the message data to the virtual node ID possessed by the transmission destination node.

In this way, given the present invention, there is no need for the complex and specialized structures such as have been required conventionally, but rather the redundant structure of the communication system can be constructed easily, enabling the achievement of a stable and continuously operating communication system.

BRIEF DESCRIPTION OF THE DRAWINGS

FIG. 2 is a transition diagram illustrating schematically the state transitions of the node statuses.

FIG. 3 is a diagram illustrating one example of a node status control table for controlling the node statuses of the plurality of nodes.

FIG. 4 is a diagram illustrating an example of an operating mode determining table.

FIG. 8 is a diagram for explaining an example of message data that is exchanged between nodes in a communication system according to the first form of embodiment according to the present invention.

FIG. 9 is a diagram for explaining, for each type of message data, the processing operations of a node wherein the operating mode is the standby state, in a communication system according to the first form of embodiment according to the present invention.

FIG. 12 is a diagram illustrating schematically the structure of a virtual node ID control table that is stored in the virtual node ID control units of a plurality of nodes in a communication system according to the second form of embodiment according to the present invention.

DETAILED DESCRIPTION OF THE PRESENT INVENTION

The drawings will be referenced below to explain forms of embodiment according to the present invention.

A communication system according to an embodiment according to the present invention includes a plurality of server devices and client devices connected to a network, where these server devices have identical functions and structures to form a redundant structure, and message data is exchanged, through a network, between these server devices and one client device.

Figure 1:
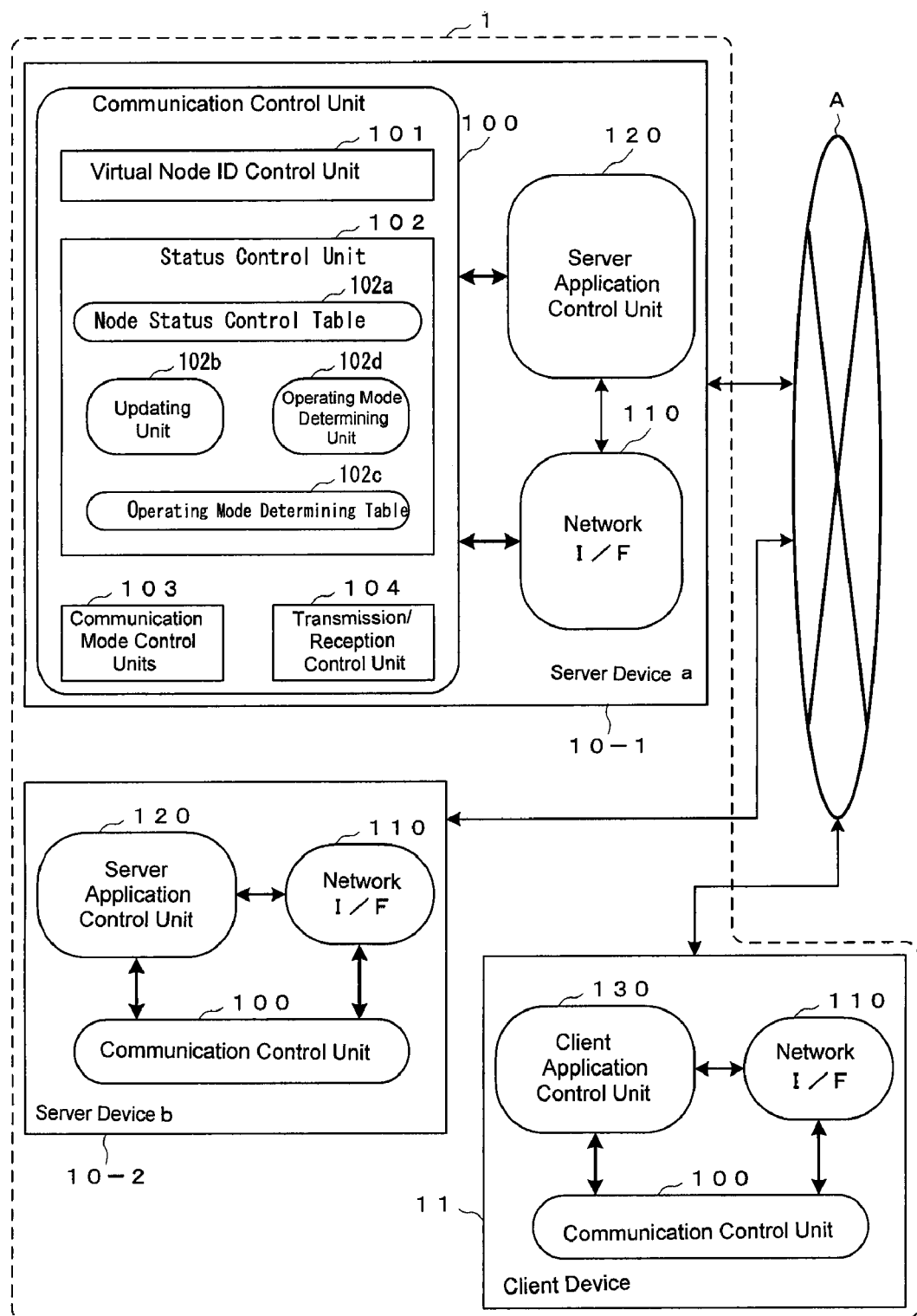
FIG. 1 is a block diagram illustrating the structure of a communication system according to a first form of embodiment according to the present invention.

As illustrated in FIG. 1, the communication system 1 according to the present form of embodiment is structured from two server devices that form a redundant structure, namely a server device a 10-1 and a server device b 10-2, and a client device 11, which exchanges message data with these server devices, all connected to a network A. These server devices and client device are communication devices such as computers that have communication functions, and function as nodes in the present invention. In the below, the server devices and client device may be referred to in general simply as "nodes."

These nodes comprise communication control units 100 for performing control of the data communication, including the exchange of message data through the network A, and network interfaces 110 for sending data to the network and receiving data from the network. Moreover, each node is equipped with a server application control unit 120 or a client application control unit 130 for controlling application programs that cause each node to function as a server device or a client device.

Here the communication control unit 100 is structured from a virtual node ID control unit 101, a status control unit 102, a communication mode control unit 103, and a transmission/reception control unit 104. The structure of the communication control unit 100 is the same for all nodes.

The virtual node ID control unit controls the virtual node IDs that specify the server device a 10-1 and the server device b 10-2, which constitute a redundant structure, as a single group.

The status control unit 102 stores, in a storing unit, not shown, of the local device, the operating status of the local node, as the node status.

Furthermore, the status control units 102 of the server device a 10-1 and the server device b 10-2, which constitute a redundant structure and which belong to a single group, exchange with each other the node statuses of the local nodes, through transmission and reception, and each store, as node status control tables 102a, each others' node statuses. Additionally, the updating units 102b of the status control units 102 update the node status control tables 102a periodically.

Furthermore, the operating mode determining units 102d of the status control units 102 of the server device a 10-1 and the server device b 10-2 use these node status control tables 102a to selectively switch the operating modes of the local nodes into either the priority mode, which causes operation as an active server, or the standby mode, which causes operation as a standby server, based on an operating mode determining table 102c.

The communication mode control unit 103 switches selectively the communication mode to data communication for a virtual node ID that is controlled in the virtual node ID control unit 101 or to data communication for a unique unicast address, based on the content of the data that is to be transmitted/received by the local node.

The transmission/reception control unit 104 controls the data communication operation, in accordance with the operating mode of the local node, depending on the communication mode selected by the communication mode control unit 103.

The communication system 1, as described above, performs multicasting of message data from the client device 11 using a virtual node ID that specifies, as a single group, the server device a 10-1 and the server device b 10-2. Furthermore, the server device a 10-1 and the server device b 10-2 determine the operating modes of the local nodes based on the operating mode determining tables 102c, using the node status control tables 102a, to set each local node into operating either as an active server or operating as a standby server, to achieve the redundant structure in the server devices 10-1 and 10-2.

Note that each individual node in the communication system 1 as set forth in the present form of embodiment is achieved through the installation of a computer program into a computer that comprises a CPU (central processing unit), a memory, and an interface, where each of the different functions in each of the nodes described above is achieved through cooperation of the various types of hardware resources of the aforementioned computers and the aforementioned computer program (software).

<Node Statuses>

The node statuses in the communication system 1 according to the present form of embodiment will be explained in reference to FIG. 2.

The node status is status information that indicates the operating status for each node. In the present form of embodiment, as illustrated in FIG. 2, the node status for an individual node is indicated by three status information: "normal," "minor fault," and "serious fault."

Here "normal" is the status wherein the local node is able to operate normally and continuously in the system, where "minor fault" is the status wherein a minor fault has occurred to the degree that the local mode is able to operate continuously in the system, and "serious fault" is the status wherein a failure has occurred to the degree that it is necessary to restart because continued operation of the local node in the system has become impossible.

The node status can transition from "normal" to "minor fault" ((a) in FIG. 2), from "minor fault" to "normal" ((b) in FIG. 2), and from "normal" or "minor fault" to "serious fault" ((c) in FIG. 2) depending on the operating state of the local node. Furthermore, the node status of a node that has a node status of "serious fault" does not transition to "normal" or "minor fault" if the node is performing continuous operations, but rather transitions to "minor fault" or "normal" after, for example, restarting that node.

For example, when, in a node that is operating normally, a fault occurs to the degree that continued operations are still possible, the node status of this node transitions from "normal" to "minor fault," and the status information of "minor fault" is controlled, as the most recent node status, by the node status control unit 102.

<Node Status Control Method>

The node status control method will be explained referencing one example of a node status control table 102a, illustrated in FIG. 3.

The node status control table 102a is data that is described by establishing the mutual relationships of the plurality of redundant server devices a 10-1 and b 10-2 so as to be in a single table. For example, as illustrated in FIG. 3, the table is described by defining the relationships between the "local node flag" that indicates that the information is for the local node, the "node information" that specifies the server node, and the "status information", or in other words, the node status, that indicates the operating status of the server node.

Additionally, the table may also be configured so as to describe the relationship with the "operating mode information" that indicates the setting information for the operating mode of the server node.

In the present example, this is the node status control table 102a that is stored in the status control unit 102 of the server device a 10-1, where the status information for both the server device a 10-1 and the server device b 10-2 are "normal," and the operating modes indicate that the server device a 10-1 is operating in priority mode and the server device b 10-2 is operating set to standby mode.

<Selecting the Operating Mode>

The selection of the operating mode based on the node status control table 102a will be explained next.

In the communication system according to the present form of embodiment, the changes in the operating server and standby server in the server devices 10-1 and 10-2, which achieve the redundant structure, or in other words, the transitions in the operating modes of the server devices 10-1 and 10-2 during operation, are performed through each individual server device selecting its own local node operating mode autonomously, based on the operating mode determining tables 102c that are stored in the status control units 102 of the individual server devices 10-1 and 10-2, using the node status control tables 102a.

The transitions of the operating modes using the node status control tables 102a in the individual server devices, described above, are performed based on the operating mode determining tables 102c.

An example of an operating mode determining table 102c is illustrated in FIG. 4. The operating mode determining table 102c illustrated in FIG. 4 is that which defines the correspondence between the combination of the status information for the server device that is operating with the operating mode set to the priority mode (the active system server device) and the status information for the server device that is operating with the operating mode set to standby mode (the standby system server device), and the behavior of either maintaining or switching the operating mode of the local node (that is, switching to the operating mode from the priority mode to the standby mode or from the standby mode to the priority mode).

For example, as illustrated in FIG. 3, the setting for the operating mode of the server device a 10-1 is the "priority mode" for operating as the active server node, and the server device b 10-2 is in the "standby mode" for operating as a standby server node, and the status information for the node statuses for each are that they are each operating "normally," and thus the behavior for setting the operating mode that is determined based on the operating mode determining table 102c that is illustrated in FIG. 4 is "maintain." Consequently, each of the server devices maintain the settings for the operating modes for the local nodes.

Here, when a failure or the like occurs in the server device a 10-1 of the active server node so that the status information for the server device a 10-1 in the node status control tables 102a transitions to "minor fault," the setting behavior for the operating mode that is selected based on the operating mode determining table 102c shown in FIG. 4, or in other words, the setting behavior for the operating mode that is selected because the node status of the operating server is "minor fault" and the node status of the standby server is "normal," will be "switch."

Consequently, the respective server devices each switch the respective local node operating mode settings from the active mode to the standby mode or from the standby mode to the active mode. The settings for the operating modes for the individual server devices in this example are switched from the priority mode to the standby mode for the server device a 10-1, and from the standby mode to the priority mode in the server device b 10-2.

<Explanation of the Node Status Control and Operating Mode Selecting Operations for the Server Nodes>

The node status control and operating mode selecting operations for the server nodes will be explained next referencing the flow chart in FIG. 5.

Figure 5:
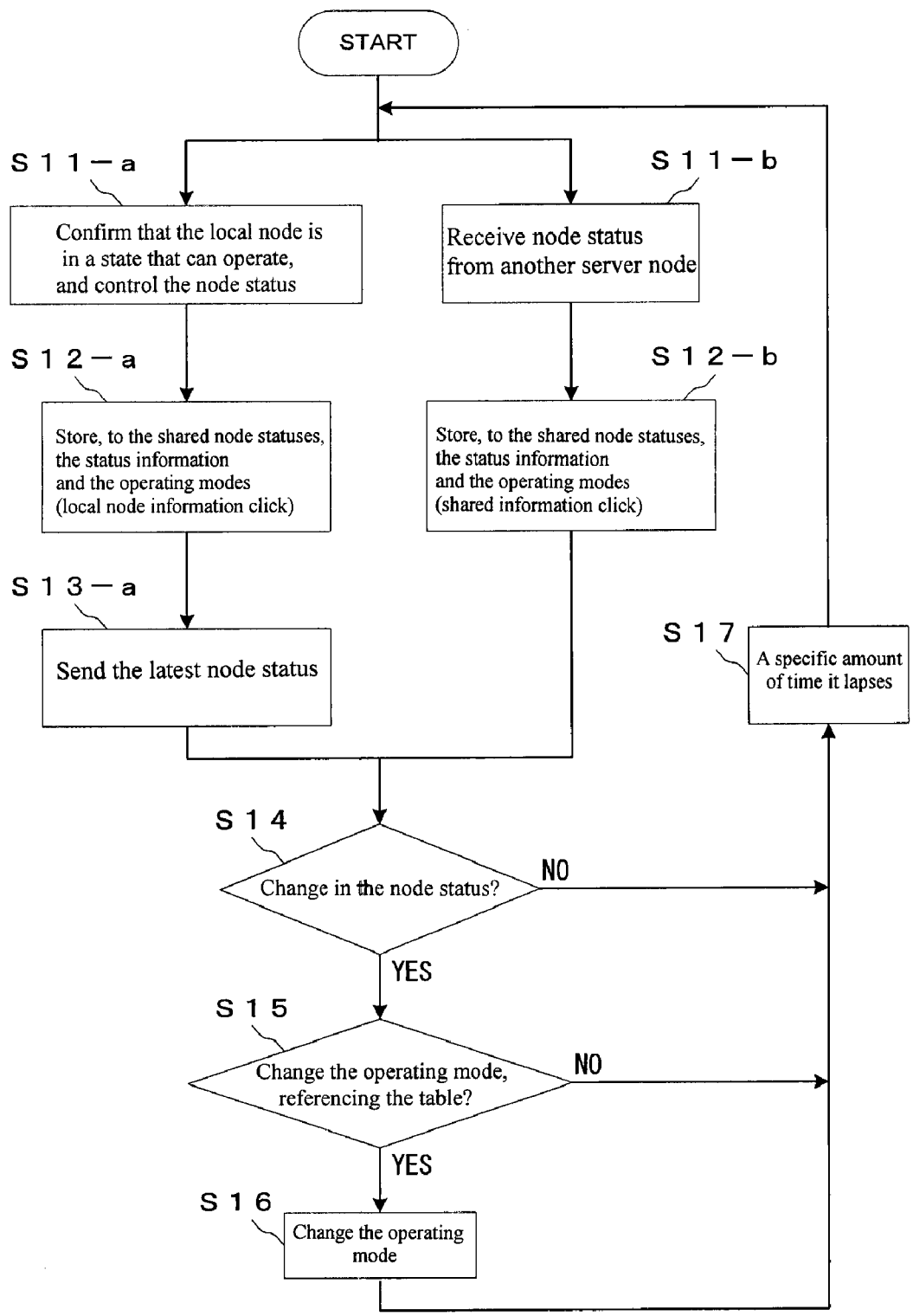
FIG. 5 is a flowchart for explaining the node status control operations and the operating mode determining operations for a node in the first form of embodiment according to the present invention.

As illustrated in FIG. 5, the updating unit 102b of the status control unit 102 of the server node checks the operating status of the local node at the current point in time (S11-*a*) and updates and stores the most recent information for the node status for the local node in the applicable "status information" of the node status control table 102a shown in FIG. 3 (S12-*a*).

Following this, the updating unit 102b sends, to the other server nodes, the most recent node status for the local node (S13-*a*).

On the other hand, when a node status sent from another server node is received (S11-*b*), the updating unit 102b updates and stores the information for the received node status into the applicable "status information" in the node status control table 102a shown in FIG. 3 (S12-*b*).

Following this, the operating mode determining unit 102d of the status control unit 102 performs an evaluation as to whether or not there has been a change in the detail stored for the "status information" in the node status control table 102a (S14).

If there has been a change in the content stored for the "status information" in the node status control table 102a ("Yes" in S14), then the operating mode determining unit 102d uses the node status control table 102a to perform an evaluation as to whether or not to change the local node operating mode from the operating mode determining table 102c (S15). If the local node operating mode is to be changed ("Yes" in S15), then the operating mode determining unit 102d changes the operating mode of the local node (S16).

For example, if the status information for the server device a 10-1 transitions to "serious fault," then the content stored in the node status control tables 102a that are controlled by the status control units 102 of each of the server nodes will have the "status information" for the server device a 10-1 change from "normal" to "serious fault." When a change occurs in the "status information" of the node status control table 102a, then the operating mode determining unit 102d for each individual server node selects the operating mode setting behavior from the operating mode determining table 102c, shown in FIG. 4, based on the updated node status control table 102a, to evaluate whether or not to change the setting of the operating mode of the local node. In this example, for the server device a 10-1, the status information is "serious fault" and the operating mode information is "priority," where, for the server device b 10-2, the status information is "normal" and the operating mode information is "standby," and thus the setting behavior for the operating mode, selected based on the operating mode determining table 102c, illustrated in FIG. 4, will be "switch." Consequently, the operating mode determining unit 102d in each server node will either change the setting for the operating mode of the local node from the priority mode to the standby mode, or from the standby mode to the priority mode.

Furthermore, if there has been no change to the detail stored in the node status control tables 102a ("No" in S14), or if there has been a change in the node status but there is no change in the operating mode of the local node ("No" in S15), then the operating mode determining unit 102d of the status control unit 102 will maintain the setting of the operating mode for the local node.

After a predetermined time has elapsed (S17), then the operating status of the local node is checked, and the node statuses sent from the other servers are received (S11-*a* or S11-*b*).

<Explanation of the Operation for Switching the Operating Modes between the Individual Server Nodes>

The switching behavior for the operating modes, performed between the server device a 10-1 and the server device b 10-2, which have identical functions, through the control of the node status control table 102a and the use of the function for selecting the operating modes of the server nodes, as described above, will be explained in reference to the sequence diagram illustrated in FIG. 6.

Figure 6:
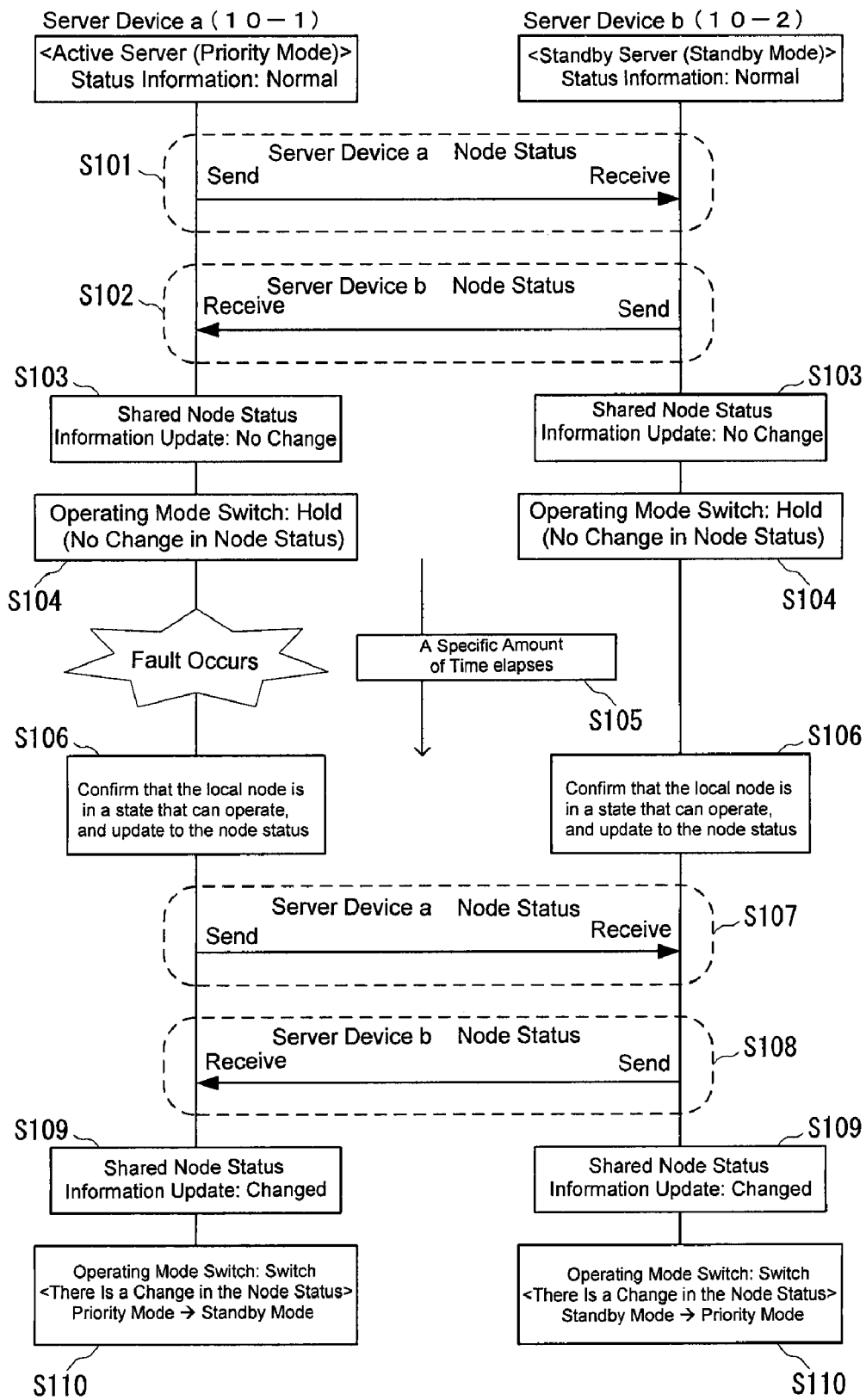
FIG. 6 is a sequence diagram for explaining the operations of constructing the redundant structure of a plurality of nodes in a communication system according to the first form of embodiment according to the present invention.

As illustrated in FIG. 6, the operating mode for the server device a 10-1 is the "priority mode," and the server device a 10-1 is operating normally, where the operating mode for the server device b 10-2 is "standby mode," and the server device b 10-2 is operating normally, and a redundant structure is constructed from these server nodes.

First the server device a 10-1 and the server device b 10-2 send the node statuses for the local nodes to the other server nodes, or in other words, the server device a 10-1 sends to the server device b 10-2, and the server device b 10-2 sends to the server device a 10-1 (S101 and S102).

Each server node updates the information stored in the node status control table 102a, controlled by the local node, based on the information contained in the node status that has been received (S103). If there is no change in the updated node status control table 102a, then there will be no change in the settings for the operating mode of any of the server nodes, and the operating mode of the local node will maintain the current status (S104).

After a predetermined amount of time has elapsed (S105), then each server node performs a check of the operating status of the local node, and updates the node status for the local node, controlled by the local node (S106).

At this time, as illustrated in FIG. 6, a fault has occurred in the server device a 10-1, and thus the status information for the node status, after updating, for the server device a 10-1 changes to either "minor fault" or "serious fault."

When each server node completes updating of the node status that is controlled by the local node, then the node status after this updating is sent to the other server nodes (S107 and S108). Each server node updates the information that is stored in the node status control table 102a that is controlled by the local node, based on information included in the node status that has been received (S109). At this time, there is a place where there has been a change in the node status in the server device a 10-1, and thus a change is produced also in the node status control table 102a.

Each server node selects the setting behavior for the operating mode from the node status control table 102a and the operating mode determining table 102c, to select the setting for the operating mode of the local node (S110), to switch the operating modes in each of these server nodes, which have identical functions, to thereby construct again the redundant structure.

Additionally, in the communication system according to the present form of embodiment, the server nodes having identical functions may have a structure of a plurality of server nodes, two or more, to construct a redundant structure from the node status control tables 102a and the operating mode determining tables 102c, as described above. In this case, the node status control tables 102a share the information for the node statuses for all of the plurality of servers that have identical functions, where the node status control tables 102a are used to determine the operating modes of the server nodes from the operating mode determining tables 102c.

In the communication system wherein the redundant structure is constructed from the plurality of server nodes, the operation for setting the operating mode of the server node will be explained here.

When the redundant structure is constructed from a plurality of server nodes, then that which operates as the active server node is one of the server nodes, where all of the other server nodes operate as standby server nodes.

When a transition in the status information occurs due to a fault, or the like, in the active server node, then each of the individual server nodes selects the setting for the operating mode for the local node based on the operating mode determining tables 102c using the node status control tables 102a, to switch the operating modes of the local nodes. For example, the active server node will switch to the standby mode, for operating as a standby server node, and one of the server nodes of the standby server nodes will switch the operating mode to the active mode; which operates as the active server node. At this time, a priority order may be established in advance for the standby system server nodes, and the server node that will execute the change in the operating mode from the standby mode to the priority mode may be selected based on that priority order.

<Operations for Exchanging Message Data between the Individual Nodes in the Communication System>

The operations for exchanging message data from the client device 11 in the communication system according to the present form of embodiment to a server device (either 10-1 or 10-2) will be explained next referencing the flowchart shown in FIG. 7.

Figure 7:
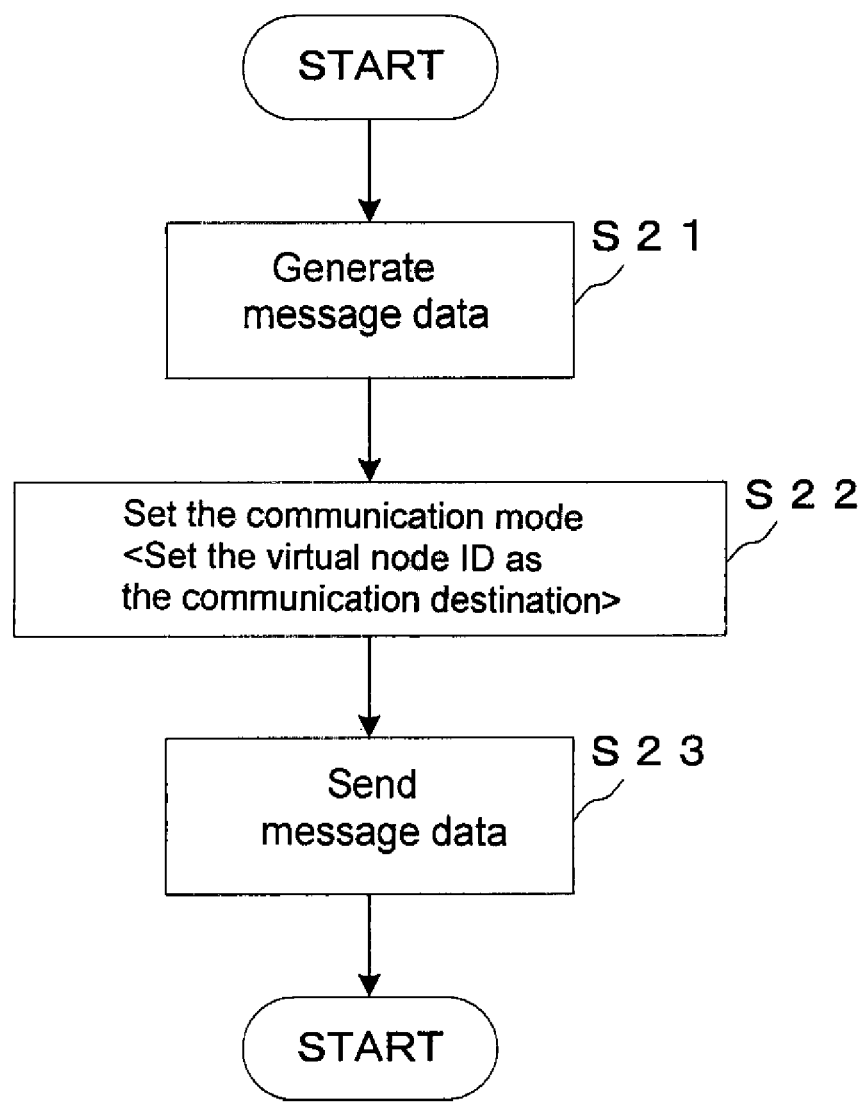
FIG. 7 is a flowchart for explaining the operations of a node for transmitting a processing request in a communication system according to the first form of embodiment according to the present invention.

When a processing request is sent from a client device 11 to the server device, the client application control unit 220 of the client device 11 generates a message, including the processing request, to each of the server devices 10-1 and 10-2, as illustrated in FIG. 7 (S21).

In order to send the message data that has been generated by the client application control unit 220, the communication control unit 100 of the client device 11 sets the communication mode of the local node to data communication through the virtual node IDs (S22). At this time, the communication mode that is set by the communication mode selecting control unit 103 of the client device 11 sets the communication mode wherein the data communication are performed through the virtual node IDs to enable the transmission of the message data simultaneously to the server devices 10-1 and 10-2, because the message data to be transmitted is a processing request to the server nodes.

When the communication mode has been set, then the transmission/reception control unit 104 of the client device 11 sends, to the virtual node ID, message data that includes the processing request to the server node (S23). By sending the message data to the virtual node ID, rather than to a unicast address that is unique for a device, the message data is sent simultaneously to both the server device a 10-1 and the server device b 10-2, which are specified, by the virtual node ID, as being in one group.

The transmission of the message data in this way can be achieved through a relay device, such as a multicast-compatible router device, distributing the message data to the plurality of server nodes that are specified by the multicast address corresponding to the virtual node ID, or in other words, to the plurality of server nodes that are specified as a single group by the virtual node ID.

The processing operations depending on the type of message data exchanged between the server nodes and the client node in the communication system according to the present form of embodiment will be explained next.

An example of message data that is exchanged between the server devices 10-1 and 10-2 and the client device 11 in the communication system according to the present form of embodiment is illustrated in FIG. 8. As shown in FIG. 8, these messages are "Requests" and "Responses" to the "Requests," and include also "Request" messages that do not require "Responses." The redundant server nodes in the communication system according to the present form of embodiment perform the transmission and reception operations for the message data in accordance with the operating modes of the local nodes.

For example, if, in the server device a 10-1 or the server device b 10-2, which have identical functions, the operating mode of the local node is "priority mode," then the normal transmission/reception processing operations corresponding to the message data, as illustrated in FIG. 8, are performed, but if in the "standby mode," then processing operations are selected appropriately and executed depending on the type of the message data.

Here the table of correspondence illustrated in FIG. 9 will be referenced in explaining the processing operations that depend on the type of the message data in a standby server node. FIG. 9 shows the details of the reception processing operations and the details for the transmission processing operations in a standby server node, for each individual type of message.

For example, in the case of a multicast transmission, using a virtual node ID, of "Write Request" message data from the client device 11 in the communication system according to the present form of embodiment, both of the server nodes will receive the "Write Request" message data. At this time, the server device a 10-1, which is operating as the active server node, performs the reception process corresponding to the received "Write Request," and then sends a "Write Response" to the client device 11. On the other hand, the server device b 10-2, which is operating as the standby server node, performs the same reception processing as the server device a 10-1, and then goes into the standby state, without sending the "Write Response" to the client device 11, as illustrated in FIG. 9.

Aside from this, if there is a request for transmission of the "Write Request" message data two an external node from a server application within the server node, then the server device a 10-1, which is the active server node, sends the message data to the external node that is the transmission destination. On the other hand, the server device b 10-2, which is the standby server node, does not send the "Write Request" message data to the outside, but rather completes the communication request by the server application by providing notification of a dummy response to the server application within the local node, as illustrated in FIG. 9.

The transmission/reception processing operations for the message data depending on the operating mode, as described above, will be explained in reference to the sequence diagram shown in FIG. 10.

Figure 10:
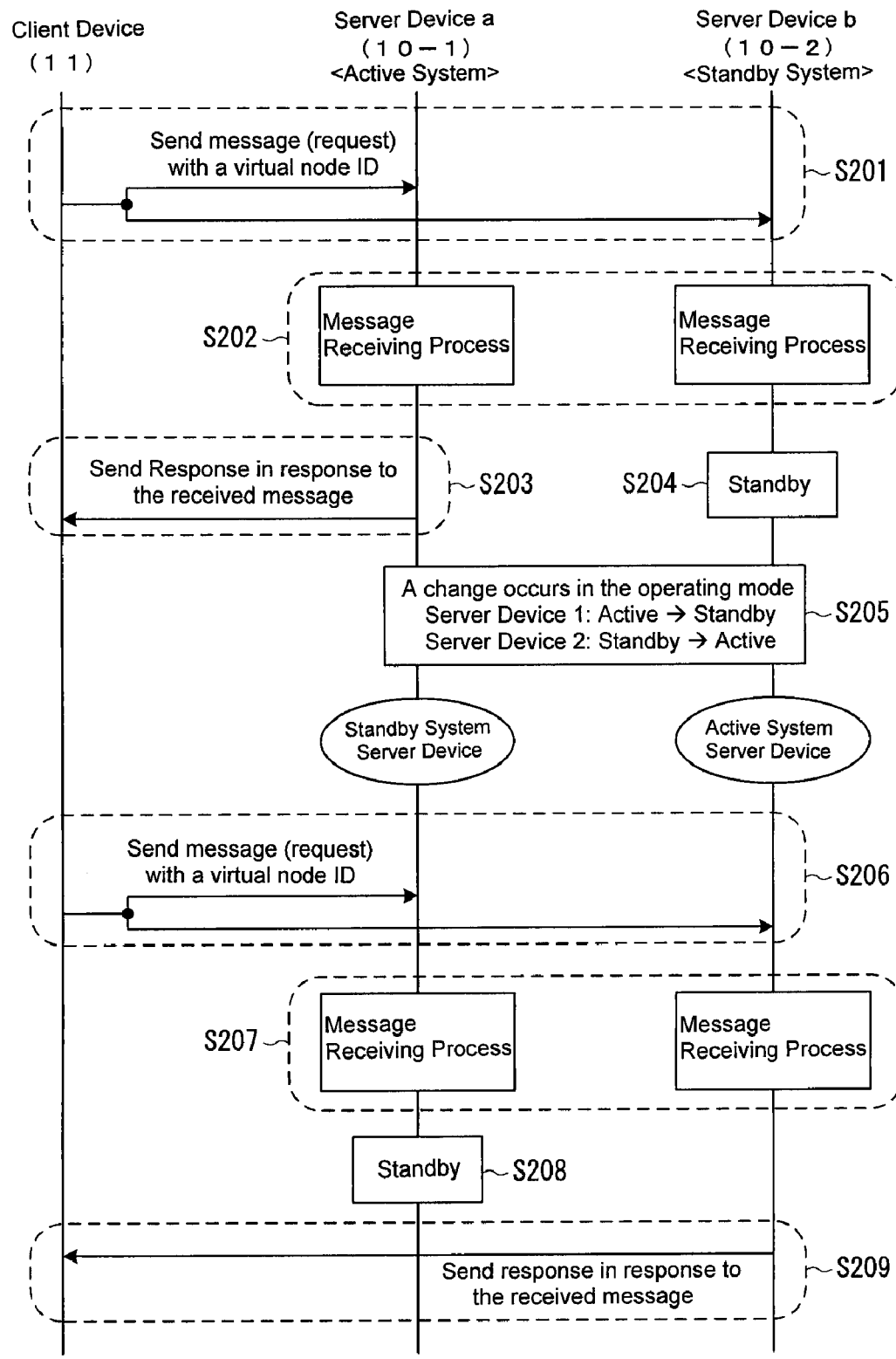
FIG. 10 is a sequence diagram for explaining the operations for exchanging message data in a communication system according to the first form of embodiment according to the present invention.

As illustrated in FIG. 10, when a "Request" message data is multicasted, using a virtual node ID, from the client device 11 through the network A to the server device a 10-1 that is operating as the active server node (hereinafter termed the "active system server node") and to the server device b 10-2 that is operating as the standby server node (hereinafter termed the "standby system server node"), the server device a 10-1 and the server device b 10-1 both receive the "request" message data (S200).

Each of the server nodes that has received the "Request" message data that was sent from the client device 11 executes its own reception process in accordance with this "Request" message data (S202). When the reception processing has been completed, then the server device a 10-1 of the active system server node sends a "Response" message data, in response to the "Request" message data that has been received, to the client device 11 (S203), to complete the communication from the client device 11. On the other hand, the server device b 10-2 that is the standby system server node, when the reception processing has been completed in response to the received message data, goes into standby without sending the "response" message data to the Client device 11 (S204).

Here, if there is a change in the operating modes of the individual servers because of the occurrence of a fault, or the like, in the active system server node (S205), then the server device b 10-2 switches to the operating system server node and the server device a 10-1 switches to the standby system server node.

Thereafter, the "Request" message data that is multicasted from the client device 11 using the virtual node ID is received by both of the server nodes (S206), and each performs its own reception processing in accordance with the received "Request" message data (S207).

The server device a 10-1 is operating as the standby server node, and thus goes into standby without sending, to the client device 11, the "Response" message data in response to the "Request" message data, while, on the other hand, the server device b 10-2 has switched to the active system server node, and thus sends the "response" message data to the client device 11 (S209). The client device 11 that sent the "Request" message data to the server nodes completes communication upon receipt of the "Response" message data from the server node.

Because it is possible for all of the nodes that are grouped by the virtual node ID to receive the message data through the client node multicasting using the virtual node ID as the transmission destination for the message data in this way, it is not necessary for the client node to specify a server node as the transmission destination for the message data.

On the other hand, the plurality of server nodes that have identical functions that are redundant are [each] able to determine whether the setting for the operating mode for the local node is to be the priority mode or the standby mode, based on the node status control table 102a wherein the node status for the local node and the node statuses for other server nodes having identical functions and belonging to the same group are all shared, and based on the operating mode determining table 102c, thereby enabling the construction of a redundant structure through a plurality of server nodes having identical functions.

Consequently, there is no need for the client node that sends, to the server node, the message data that is a processing request to evaluate whether or not the server node that is the transmission destination for the message data is a redundant structure, making it possible to send the message data properly to a server node that has a redundant structure through multicasting using the virtual node ID that is possessed by the transmission destination node.

Because of this, it is possible to separate the server functions, which are equipped in common in the plurality of server nodes that have identical functions, from the processing functions for determining the operating modes of the local nodes that form the redundant structure, making it easy to provide the processing functions for constructing the redundant structures.

Another embodiment according to the present invention will be explained next in reference to FIG. 11. The communication system according to the present form of embodiment is a communication system that is structured from a plurality of nodes connected to a network, structured from arbitrary nodes having identical functions and structures that operate as server nodes, and arbitrary nodes having identical functions and structures that operate as client nodes, where, of these arbitrary nodes, a plurality of nodes form a redundant structure, where these arbitrary server nodes and client nodes exchange message data through the network.

Note that in the structural elements relating to the communication system according to the present form of embodiment, identical codes are assigned, and detailed explanations thereof are omitted, for those structural elements having structures and functions that are identical to the structural elements explained in the first form of embodiment.

Additionally, each of the nodes in the communication system 2 according to the present form of embodiment is achieved through the installation of a computer program onto a computer that comprises a CPU (a central processing unit), a memory, and an interface, where the various functions of each of the nodes, described above, are achieved through the cooperation of the various types of hardware resources of the computer and the computer program (software) described above.

Figure 11:
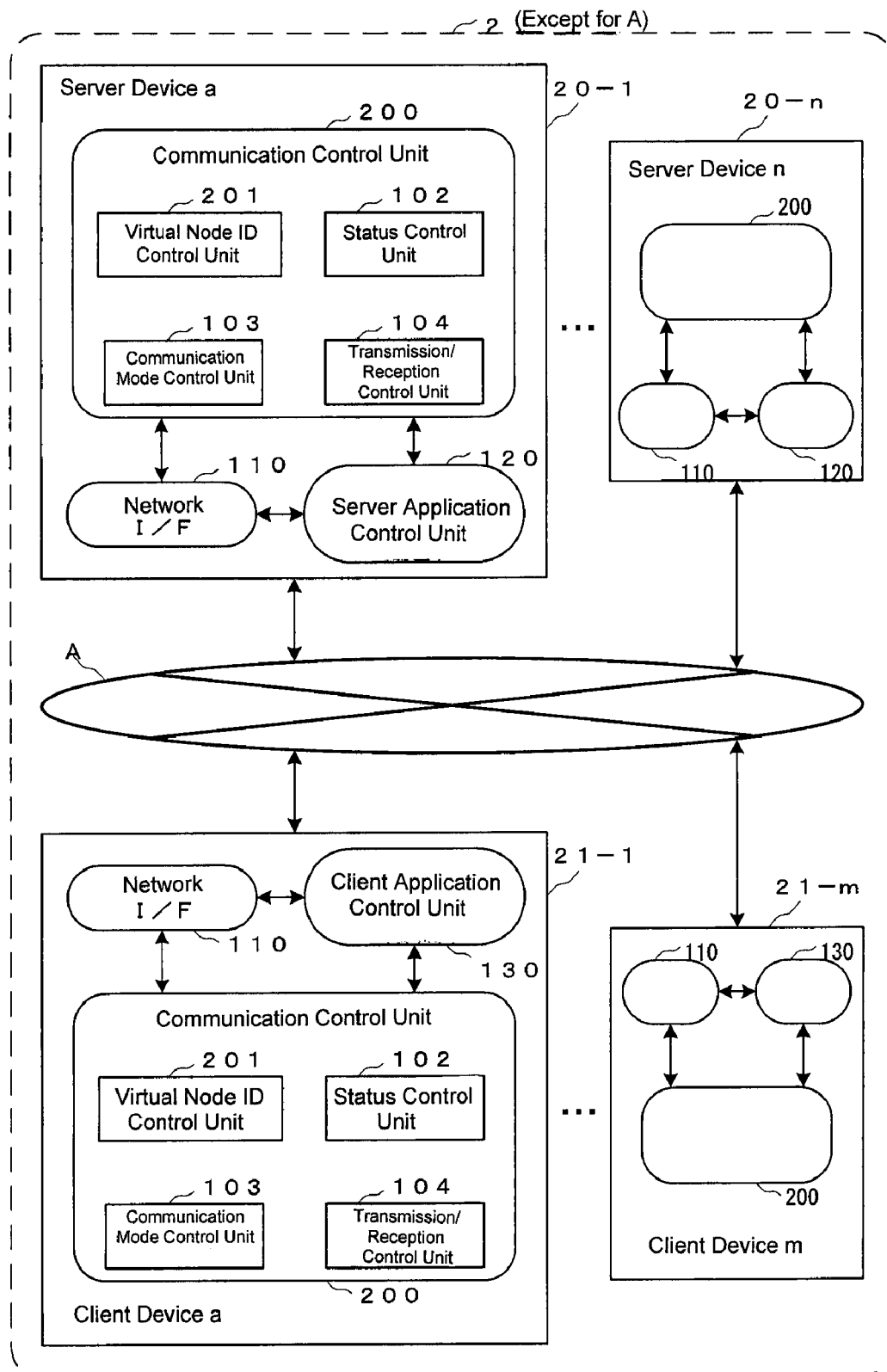
FIG. 11 is a block diagram illustrating the structure of a communication system according to a second form of embodiment according to the present invention.

As illustrated in FIG. 11, the communication system 2 according to the present form of embodiment is structured from server devices 20-1 through 20-n and client devices 21-1 through 21-m, connected to a network A.

The server devices 20-1 through 20-n and the client devices 21-1 through 21-m (hereinafter termed "the individual nodes") are each structured from a communication control unit 200 for performing the control of data communication, including the transmission and reception of message data through the network A, a network interface 110, and a server application control unit 120 or client application control unit 130.

Furthermore, the communication control unit 200, which is the identical in each node, is structured from a virtual node ID control unit 201, a status control unit 102, a communication mode control unit 103, and a transmission/reception control unit 104.

The virtual node ID control unit 201 controls a virtual node ID table that stores the unique unicast addresses of the server devices 20-1 through 20-n and the client devices 21-1 through 21-m that structure the communication system 2 according to the present form of embodiment, in relation to virtual node IDs.

Here an example of a virtual node ID table controlled by the virtual node ID control unit 201 is shown in FIG. 12.

The virtual node ID table is a table that defines and stores the relationships of the nodes corresponding to the virtual node IDs. Additionally, the virtual node ID control unit 201 may be able to store the virtual node ID tables with different conditions for each node.

For example, as illustrated in FIG. 12, a virtual node ID "A" for which the multicast address is "☐☐☐☐" specifies that the client devices a-m, or in other words, all of the client nodes that structure the communication system 2, as being in the same group.

Furthermore, the virtual node ID "A" may be controlled through storage in the virtual node ID table that is controlled by the virtual node ID control unit 201 of the server device a 20-1, but, in that of the server device b 20-2, the virtual node ID "A" may be not stored, but rather another virtual node ID "X" may be stored and controlled.

When, in this way, message data is exchanged using the virtual node ID table, this is achieved by the server device a 20-1 sending the message data to the multicast address "☐☐☐☐" that corresponds to the virtual node ID "A" that specifies that all of the client nodes are a single group, from the virtual node ID table that is controlled by the virtual node ID control unit 201 of the server device a 20-1, when a message is to be sent from the server device a 20-1 to all of the client nodes that are structural elements of the communication system 2.

Additionally, when a plurality of server nodes, for example, server device a through server device n structure a redundant structure, then this is achieved through sending message data to all of the server nodes that form the redundant structure, even if the redundant structure comprises an arbitrary plurality of server nodes, through the client device m 21-m sending message data to a multicast address "ΔΔΔΔ" that corresponds to a virtual node ID "B" that specifies that the server device a through the server device n are a single group, from the virtual node ID table that is controlled by the virtual node ID control unit 201.

In this way, it is possible to perform the exchange of data flexibly, in accordance with the purpose for the communication within the communication system, through making any given combination of nodes correspond to the virtual node ID, and through controlling the virtual node ID table under conditions that vary from node to node. That is, it is possible to perform the maintenance operations for the communication system, namely, those of checking the state of data communication and swapping the nodes that form the redundant structures, easily and flexibly.

The present invention can be used in communication systems that perform production line control and management in order to achieve increased manufacturing efficiency in product manufacturing, in communication systems that monitor and perform maintenance of operations of large-scale continuously operating facilities, such as plant facilities, and other communication systems that require stable and continuous operations. Furthermore, the present invention can be used also in inexpensive communication systems, because the redundant structure can be achieved easily, without requiring complex and specialized functions and structures.

The invention claimed is:

1. A communication system comprising:
  a plurality of nodes that form a network and that transmit and receive data, wherein:
  each node of plural nodes which are part of the plurality of nodes, comprises:
    a virtual node ID control unit configured to control a virtual node ID that specifies the plural nodes as a single group;
    a status control unit configured to control node statuses that include information indicating operating statuses of each node belonging to the single group, and to select an operating mode that is either a priority mode wherein the each node of plural nodes operates as an active node, or a standby mode wherein the each node of the plural nodes operates as a standby node;
    a transmission/reception control unit configured to control an operation of the each node of the plural nodes in accordance with the operating mode selected by the status control unit; and
    a communication mode control unit configured to select, based on content of data sent or received by the each node of the plural nodes, a communication mode that is either data communication through a virtual node ID, or data communication through a unique unicast address,
  the virtual node ID control unit stores a virtual node ID table that defines and stores a relationship of nodes having unique unicast addresses and the virtual node ID, the relationship indicating whether or not each node is treated as the single group, and
  the relationship in the table is different among the plural nodes.

* * * * *